United States Patent
Kushino

(10) Patent No.: US 7,276,010 B2
(45) Date of Patent: Oct. 2, 2007

(54) DRIVE FORCE TRANSMISSION DEVICE

(75) Inventor: Hiroshi Kushino, Obu (JP)

(73) Assignee: JTEKT Corporation, Osaka (JP)

( * ) Notice: Subject to any disclaimer, the term of this patent is extended or adjusted under 35 U.S.C. 154(b) by 156 days.

(21) Appl. No.: 11/136,600

(22) Filed: May 23, 2005

(65) Prior Publication Data

US 2005/0266955 A1 Dec. 1, 2005

(30) Foreign Application Priority Data

Jun. 1, 2004 (JP) .............. 2004-163238

(51) Int. Cl.
  *F16H 48/10* (2006.01)
  *F16H 48/22* (2006.01)
(52) U.S. Cl. ..................... 475/249
(58) Field of Classification Search ........... 475/248, 475/249, 231
  See application file for complete search history.

(56) References Cited

U.S. PATENT DOCUMENTS 6,722,482 B2* 4/2004 Takuno et al. ............ 192/35

2001/0003719 A1* 6/2001 Fukuno et al. ............ 475/249

FOREIGN PATENT DOCUMENTS

JP  09-144845 A  6/1997

OTHER PUBLICATIONS

Patent Abstracts of Japan for JP09-144845 published Jun. 3, 1997.

* cited by examiner

*Primary Examiner*—Rodney H. Bonck
*Assistant Examiner*—Derek D. Knight
(74) *Attorney, Agent, or Firm*—Darby & Darby

(57) ABSTRACT

A main clutch is disposed radially outward on a differential mechanism. There is no need to reserve space to install the main clutch at the end of the differential mechanism opposite from a differential case. Thus, the axial length of an LSD can be reduced, providing easier installation in the vehicle. Also, the LSD is installed in the vehicle to the rear of a transmission. This location provides spatial leeway in the radial direction. As a result, ease of installation is maintained if the main clutch is disposed radially outward from the differential mechanism and the outer diameter of the LSD is increased. The present invention provides a drive force transmission device with reduced axial length, thereby improving ease of installation.

12 Claims, 1 Drawing Sheet

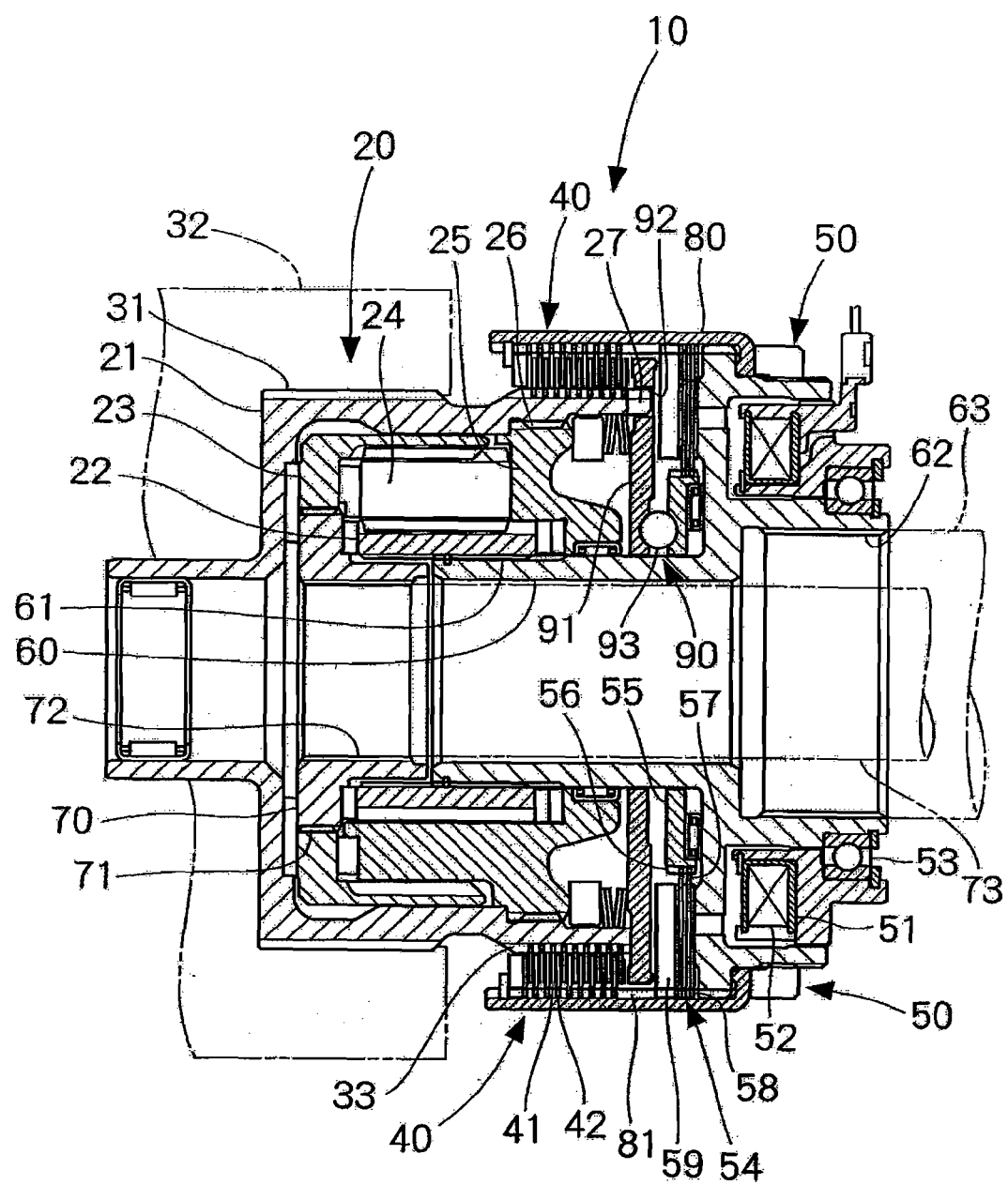

DRIVE FORCE TRANSMISSION DEVICE

INCORPORATION BY REFERENCE

The present application claims priority under 35 U.S.C. §119 to Japanese Patent Application No. 2004-163238 filed on Jun. 1, 2004. The content of the application is incorporated herein by reference in its entirety.

BACKGROUND OF THE INVENTION

The present invention relates to a drive force transmission device that distributes a drive source for a vehicle or the like to a plurality of output shafts while allowing torque differentials.

Conventionally, drive force transmission devices equipped with a differential restriction device that restricts differential operations of a differential device are well known, e.g., see Japanese Laid-Open Patent Publication Number Hei 9-144845 (JP '845). The differential restriction device in JP '845 includes differential means equipped with: a differential case connected to a drive shaft of an engine that rotates in tandem with the drive shaft; a sun gear and internal gear rotatably housed in the differential case; and a pinion gear meshing with the sun gear and the internal gear. A friction clutch is interposed between the differential case and the sun gear or the internal gear of differential means and is clamped by clamping means.

In the differential restriction device disclosed in JP '845, a friction clutch is disposed between the members forming differential means so that the shafts at the ends of the pinion gear (elements 119 and 121 in FIG. 2 of JP '845) are eliminated. This makes it possible to reduce the space needed to install the pinion gear, thus allowing a compact design.

However, in the differential restriction device disclosed in JP '845, differential means, the friction clutch, and clamping means are aligned along a single axis. This makes it difficult to reduce the total length along the axis. For example, if the total axial length of a differential restriction device installed in a transfer case is too long, the transfer must have a longer total length, resulting in increased weight. As a result, shorter axial lengths for differential restriction devices are preferable for improving the ease of installation of the differential restriction device.

SUMMARY OF THE INVENTION

The present invention provides a drive force transmission device that reduces the axial length for easier installation.

The drive force transmission device according to an embodiment of the present invention includes: an input member, formed as a cylinder with a bottom, receiving a torque from a drive source; differential means, disposed inside the input member, distributing a torque received from the drive source by way of the input member to two output shafts while allowing a differential; a projection member rotating integrally with one of the output shafts, a section of which projects radially outward from the input member; clutch means disposed between an outer perimeter of the input member and the projection member; and clamping means clamping clutch means. Clutch means is disposed radially outward from differential means. As a result, there is no need to provide space for installation of clutch means. Thus, the axial length can be reduced and the ease of installation into the vehicle can be improved. Also, the drive force transmission device described above can, for example, be housed inside a transfer case and the transfer case can be disposed to the rear of the transmission, which changes the speed of and transmits the drive force from the engine. The outer diameter of the transmission is larger than that of the drive force transmission device. As a result, adequate space is provided radially outward from the drive force transmission device. Thus, clutch means can be disposed radially outward from differential means without making the drive force transmission device more difficult to install.

The differential means described above can include: an internal gear rotatably housed inside the input member; a sun gear disposed co-axially with and inside the internal gear; a pinion gear disposed between the internal gear and the sun gear and meshing with both the internal gear and the sun gear; and a pinion carrier that supports the pinion gear to allow revolving and rotating and that rotates integrally with the input member. The projection member can rotate integrally with the sun gear.

The drive force transmission device can include an engagement groove that meshes with a torque transmission member transmitting torque from the drive source formed on an outer perimeter of the input member. Clutch means is formed from an inner friction plate that engages with a section of the engagement groove and an outer friction plate that engages with the projection member. As a result, clutch means is disposed on the outer perimeter side of the input member. Thus, the axial length can be reduced and installation to the vehicle is made easier.

The drive force transmission device can include clamping means that includes: a cam mechanism generating a thrust force from relative rotation between a first cam member facing clutch means and a second cam member facing another side of the first cam member; and an electromagnetic clutch activating the cam mechanism. The first cam member includes a hole into which a projection formed at an end of the input member can be fitted. Fitting the projection into the hole results in the first cam member being prevented from rotating by the input member.

The above, and other objects, features and advantages of the present invention will become apparent from the following description read in conjunction with the accompanying drawings, in which like reference numerals designate the same elements.

BRIEF DESCRIPTION OF THE DRAWING

FIG. 1 is a cross-sectional drawing showing a limited slip differential (LSD) according to an embodiment of the present invention.

DETAILED DESCRIPTION OF THE PREFERRED EMBODIMENTS

An embodiment of the present invention is described below with references to FIG. 1.

FIG. 1 is a drive force transmission device (LSD, Limited Slip Differential) 10 according to an embodiment of the present invention. The LSD 10 according to this embodiment is installed at the rear wheel side of a transmission installed between the front wheels and the rear wheels of a vehicle not shown in the figure. In this embodiment, the LSD 10 is installed in a four-wheel drive vehicle and receives the drive force generated by an engine and transmitted from the transmission. The LSD 10 distributes the drive force to the front wheels and the rear wheels while absorbing differentials. The engine corresponds to a drive source.

The LSD 10 includes a differential mechanism 20 serving as differential means, a main clutch 40 serving as clutch means; an electromagnetic clutch 50 serving as clamping means or clamp, and a cam mechanism 90. The differential mechanism 20 includes a differential case 21, a sun gear 22, an internal gear 23, and a pinion gear 24. The differential mechanism 20 corresponds to a "differential means" of the invention. The differential case 21, which serves as an input member, is formed as a cylinder with a bottom and includes an input-side engagement section 31 at its outer perimeter. The input-side engagement section 31 is formed with an engagement groove that meshes with a transmission member 32 that transmits drive force that is output from a transmission not shown in the figure. This transmission member 32 corresponds to the torque transmission member of the present invention. The differential case 21 receives the drive force from the transmission in this manner. More specifically, the differential case 21 connects to the transmission member 32 and rotates in tandem with the transmission member 32. Also, a clutch engagement section 33 is formed on the outer perimeter of the differential case 21 and is aligned in a straight line with the input-side engagement section 31 in the axial direction. The input-side engagement section 31 and the clutch engagement section 33 are formed with identical engagement groove depths and widths.

The sun gear 22 and the internal gear 23 are housed in the differential case 21. The sun gear 22 meshes with a first drive force transmission member 60. The first drive force transmission member 60 is formed as a cylinder. The first drive force transmission member 60 includes on its outer perimeter an engagement section 61 that meshes with the sun gear 22 and on its inner perimeter a spline engagement section 62. The first drive force transmission member 60 is connected at the spline engagement section 62 to a front-wheel output shaft member 63 that serves as an output shaft. As a result, the rotational force of the sun gear 22 is transmitted to the front-wheel output shaft member 63 by way of the first drive force transmission member 60.

The front-wheel output shaft member 63 includes a sprocket not shown in the figure behind the LSD 10, i.e., on the side opposite from the transmission. The output shaft member 63 can mesh by way of the sprocket not shown in the figure with a propeller shaft extending parallel to the output shaft member 63 to the front of the vehicle, i.e., to the transmission side. As a result, the rotational force of the output shaft member 63 is transmitted to the front wheels of the sprocket not shown in the figure and the propeller shaft.

The internal gear 23 meshes with a second drive force transmission member 70. The second drive force transmission member 70 includes, on its outer perimeter, an internal engagement section 71 that engages with the internal gear 23 and, on its inner perimeter, a spline engagement section 72. The second drive force transmission member 70 is connected at the spline engagement section 72 to a rear-wheel output shaft member 73 serving as an output shaft. As a result, the rotational force of the internal gear 23 is transmitted to the rear-wheel output shaft member 73 by way of the second drive force transmission member 70. The rear-wheel output shaft member 73 passes through the front-wheel output shaft member 63, which is formed as a cylinder, and extends to the rear of the vehicle. As a result, the rotational force of the output shaft member 73 is transmitted to the rear wheels.

The pinion gear 24 is disposed between the outer perimeter side of the sun gear 22 and the inner perimeter side of the internal gear 23 and meshes with the sun gear 22 and the internal gear 23. The pinion gear 24 is rotatably supported by a pinion carrier 25. The pinion carrier 25 engages with the differential case 21 at the engagement section 26 and transmits the rotational force of the differential case 21 to the pinion gear 24.

The rotation of the differential case 21 together with the transmission member 32 of the transmission causes the drive force to be transmitted from the differential case 21 to the pinion gear 24 by way of the pinion carrier 25, causing the pinion gear 24 to revolve. The pinion gear 24 distributes the transmitted drive force to the sun gear 22 and the internal gear 23. The drive force distributed to the sun gear 22 is transmitted by way of the first drive force transmission member 60 to the front-wheel output shaft member 63. The drive force distributed to the internal gear 23 is transmitted to the rear-wheel output shaft member 73 by way of the second drive force transmission member 70. Also, if a rotation speed difference occurs between the front-wheel output shaft member 63 and the rear-wheel output shaft member 73, the pinion gear 24 rotates. As a result, the drive force is differentially distributed between the front-wheel output shaft member 63 and the rear-wheel output shaft member 73. The contact surface friction resistance that exists when the drive force is transmitted from the pinion carrier 25 to the pinion gear 24 serves as the rotation resistance of the pinion gear 24. This rotation resistance provides differential restriction on the sun gear 22 and the internal gear 23. This rotation resistance changes according to the torque transmitted from the pinion gear 25 to the pinion gear 24, so that the differential mechanism 20 acts as a torque sensitive differential restriction mechanism.

A section of the first drive force transmission member 60 projects outward along the radius of the differential case 21, and this projection is secured to the rotation member 80. More specifically, the first drive force transmission member 60 and the rotation member 80 correspond to the "projection member" of the invention. The main clutch 40 is disposed between the outer perimeter of the differential case 21 and the rotation member 80. The main clutch 40 is a multiple-disc clutch equipped with multiple plate members. The rotation member 80 is secured radially outward on the first drive force transmission member 60 and rotates in tandem with the first drive force transmission member 60. As a result, the rotation member 80 is rotated together with the first drive force transmission member 60 by the drive force transmitted by the sun gear 22.

The main clutch 40 includes: inner friction plates 41 that form a spline engagement with and can move along the axial direction relative to the clutch engagement section 33 of the differential case 21; and outer friction plates 42 that form a spline engagement with and can move along the axial direction relative to an engagement section 81 formed on the inner wall of the rotation member 80. The inner friction plates 41 and the outer friction plates 42 of the main clutch 40 are layered in an alternating manner along the axial direction.

The electromagnetic clutch 50 and the cam mechanism 90 are clamping means that clamp the main clutch 40. The electromagnetic clutch 50 includes an electromagnetic drive section 51 that is housed in the first drive force transmission member 60 on the side opposite along the axial direction from the differential case 21. The electromagnetic drive section 51 includes a coil 52 that generates a magnetic field using electricity. The electromagnetic drive section 51 is rotatably supported by the first drive force transmission member 60 by way of a bearing 53. The electromagnetic drive section 51 is stopped from rotating relative to the vehicle body.

A pilot clutch 54 is disposed on the side of the first drive force transmission member opposite from the electromagnetic drive section 51, i.e., on the side of the differential case 21. A second cam member 55 is disposed radially inward from the pilot clutch 54. The pilot clutch 54 includes: inner friction plates 57 engaging with an engagement section 56 of a second cam member 55 in a manner that allows movement only in the axial direction; and outer friction plates 58 engaging with an engagement section 81 formed on the inner wall of a rotation member 80 in a manner that allows movement only in the axial direction. These are arranged in an alternating manner along the axial direction. An armature 59 is disposed on the side of the pilot clutch 54 opposite from the electromagnetic drive section 51, i.e., on the side of the differential case 21. The armature 59 is formed from a magnetic material. When electricity passes through the coil 52 of the electromagnetic drive section 51, the armature 59 moves toward the electromagnetic drive section 51.

A first cam member 91 serving as a pressing member that presses the main clutch 40 is disposed on the side of the second cam member 55 toward the differential case 21 and faces the inner friction plates 41 or the outer friction plates 42. The first cam member 91 has a disc shape and includes a cylindrical hole 92 that passes all the way through along the thickness axis. A projection 27 of the differential case 21 is inserted through the hole 92. This hole 92 stops the first cam member 91 from rotating relative to the differential case 21. Cam balls 93 are disposed between the second cam member 55 and the first cam member 91. As a result, the second cam member 55, the first cam member 91, and the cam ball 93 form the cam mechanism 90. The electromagnetic clutch 50 is formed from the electromagnetic drive section 51, the pilot clutch 54, the second cam member 55, the armature 59, and the like.

Next, the operations of the LSD 10 according to this embodiment is described.

A torque sensor or rotation count sensor not shown in the figure detects when the torque difference or rotation count difference between the front wheels and the rear wheels of the vehicle reach or exceed a predetermined value. When this happens, the differential of the LSD 10 is restricted. When the differential of the LSD 10 is restricted, electricity is sent through the coil 52 of the electromagnetic drive section 51. As a result, the coil 52 generates an electromagnetic field and the armature 59 moves toward the electromagnetic drive section 51. This causes the inner friction plates 57 and the outer friction plates 58 of the pilot clutch 54 to be pushed in the axial direction, resulting in friction engagement in the pilot clutch 54. This leads to the rotation force of the rotation member 80 being transmitted to the second cam member 55.

The projection 27 of the differential case 21 inserted through the hole 92 prevents rotation of the first cam member 91 relative to the differential case 21. As a result, the relative rotation of the differential case 21 and the rotation member 80 results in the second cam member 55 and the first cam member 91 rotating relative to each other. As a result, a thrust force in the axial direction occurs at the cam mechanism 90, and the main clutch 40 is pushed in the direction opposite from the electromagnetic drive section 51 by way of the first cam member 91. This causes the inner friction plates 41 and the outer friction plates 42 of the main clutch 40 to be compressed in the axial direction, resulting in friction engagement in the main clutch 40. This restricts the differential between the rotation member 80 and the differential case 21.

With the operation described above, when electricity passes through the coil 52, frictional engagement takes place at the electromagnetic clutch 50 and the main clutch 40, and the differential between the differential case 21 and the first drive force transmission member 60 is restricted. This frictional engagement can be electronically controlled by the amount of electricity sent to the coil 52. As a result, differential restriction can be controlled so that it is optimal for the vehicle running status as detected by various types of sensors in the vehicle.

As described above, in the LSD 10 of this embodiment, the main clutch 40 is disposed radially outward on the differential mechanism 20. As a result, there is no need to provide space for the main clutch 40 at the end of the differential mechanism 20 opposite from the differential case 21. This makes it possible to reduce the axial length of the LSD 10 and improve the ease of installation into vehicles. Also, since the LSD 10 is installed in the vehicle to the rear of the transmission, not shown in the figure, space is available in the radial direction. Thus, disposing the differential mechanism 20 radially outward on the main clutch 40 and increasing the outer diameter of the LSD 10 does not reduce ease of installation.

Also, in this embodiment, the main clutch 40 is disposed between the differential case 21 and the rotational member 80 secured to the first drive force transmission member 60, which meshes with the sun gear 22. The sun gear 22 is disposed further inward than the internal gear 23, so that the torque applied to the sun gear 22 is less than the torque applied to the internal gear 23. By providing differential restriction using the main clutch 40 between the differential case 21 and the first drive force transmission member 60 meshing with the sun gear 22, a wide electronically controllable range for the distribution of torque from the drive force is possible. Also, by controlling the electricity sent to the coil 52, torque can be distributed uniformly to the first drive force transmission member 60 and the second drive force transmission member 70.

Also, the friction plates of the main clutch 40 (the inner friction plates 41 and the outer friction plates 42) have larger diameters than those of conventional structures in which these friction plates are housed in the differential case 21. Thus, even if the length along the radial direction is shorter, a large friction surface area can be provided and surface pressure and load on the friction surfaces can be reduced. Also, the length along the radial direction of the friction plates can be made shorter compared to that of the conventional structure.

Furthermore, in this embodiment, the clutch engagement section 33 and the input-side engagement section 31 of the differential case 21 have the same specifications. As a result, machining is made easier and the main clutch 40 and the differential case 21 can be mounted from the same direction. In particular, the main clutch 40 has a multi-disc structure. As a result, the mounting direction can be unified with that of the differential case 21, and the mounting of the differential case 21 and the main clutch 40 is made easier.

In the example presented in the embodiment of the present invention described above, the clamping of the main clutch 40 is achieved by the clamping of the electromagnetic clutch 50. However, the clamping of the main clutch 40 is not restricted to the electromagnetic clutch 50. Clamping can also be achieved, e.g., by a hydraulic piston.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A drive force transmission device comprising:
   an input member, comprising a cylinder with a bottom, receiving a torque from a drive source;
   differential means, disposed inside said input member, distributing said torque received from said drive source by way of said input member to two output shafts while allowing a differential;
   a projection member rotating integrally with one of said output shafts, a section of which projects radially outward from said input member;
   clutch means disposed between an outer perimeter of said input member and said projection member; and
   clamping means clamping said clutch means.

2. The drive force transmission device as described in claim 1, wherein: said differential means comprises
   an internal gear rotatably housed inside said input member;
   a sun gear disposed co-axially with and inside said internal gear;
   a pinion gear disposed between said internal gear and said sun gear and meshing with both said internal gear and said sun gear; and
   a pinion carrier supporting said pinion gear allowing revolving and rotating and rotates integrally with said input member; and said projection member rotates integrally with said sun gear.

3. The drive force transmission device as described in claim 2 wherein:
   an engagement groove meshing with a torque transmission member transmitting torque from said drive source formed on said outer perimeter of said input member; and
   said clutch means formed from an inner friction plate engaging a section of said engagement groove and an outer friction plate engaging said projection member.

4. The drive force transmission device as described in claim 1, wherein:
   said clamping means comprises a cam mechanism generating a thrust force from relative rotation between a first cam member facing said clutch means and a second cam member facing another side of said first cam member; and
   an electromagnetic clutch activating said cam mechanism;
   said first cam member includes a hole into which a projection at an end of said input member is formed and fined; and fitting said projection into said hole preventing said first cam member from rotating by said input member.

5. The drive force transmission device as described in claim 2, wherein:
   said clamping means comprises a cam mechanism generating a thrust force from relative rotation between a first cam member facing said clutch means and a second cam member facing another side of said first cam member; and
   an electromagnetic clutch activating said cam mechanism;
   said first cam member includes a hole into which a projection at an end of said input member is formed and fitted; and fitting said projection into said hole preventing said first cam member from rotating by said input member.

6. The drive force transmission device as described in claim 3, wherein:
   said clamping means comprises a cam mechanism generating a thrust force from relative rotation between a first cam member facing said clutch means and a second cam member facing another side of said first cam member; and
   an electromagnetic clutch activating said cam mechanism;
   said first cam member includes a hole into which a projection at an end of said input member is formed and fitted; and fitting said projection into said hole preventing said first cam member from rotating by said input member.

7. A drive force transmission device comprising:
   an input member, comprising a cylinder with a bottom, receiving a torque from a drive source;
   a differential mechanism, disposed inside said input member, distributing said torque received from said drive source by way of said input member to two output shafts while allowing a differential;
   a projection member rotating integrally with one of said output shafts, a section of which projects radially outward from said input member;
   a main clutch disposed between an outer perimeter of said input member and said projection member; and
   a clamp clamping said main clutch.

8. The drive force transmission device as described in claim 7, wherein:
   said differential mechanism comprises an internal gear rotatably housed inside said input member;
   a sun gear disposed co-axially with and inside said internal gear;
   a pinion gear disposed between said internal gear and said sun gear and meshing with both said internal gear and said sun gear; and
   a pinion carrier supporting said pinion gear allowing revolving and rotating and rotates integrally with said input member; and
   said projection member rotates integrally with said sun gear.

9. The drive force transmission device as described in claim 8, wherein:
   an engagement groove meshing with a torque transmission member transmitting torque from said drive source formed on said outer perimeter of said input member; and
   said main clutch formed from an inner friction plate engaging a section of said engagement groove and an outer friction plate engaging said projection member.

10. The drive force transmission device as described in claim 7, wherein:
    said clamp comprises a cam mechanism generating a thrust force from relative rotation between a first cam member facing said main clutch and a second cam member facing another side of said first cam member; and
    an electromagnetic clutch activating said cam mechanism; said first cam member includes a hole into which a projection at an end of said input member is formed and fitted; and
    fitting said projection into said hole preventing said first cam member from rotating by said input member.

11. The drive force transmission device as described in claim 8, wherein:

said clamp comprises a cam mechanism generating a thrust force from relative rotation between a first cam member facing said main clutch and a second cam member facing another side of said first cam member; and an electromagnetic clutch activating said cam mechanism;

said first cam member includes a hole into which a projection at an end of said input member is formed and fitted; and fitting said projection into said hole preventing said first cam member from rotating by said input member.

12. The drive force transmission device as described in claim 9, wherein:

said clamp comprises a cam mechanism generating a thrust force from relative rotation between a first cam member facing said main clutch and a second cam member facing another side of said first cam member; and an electromagnetic clutch activating said cam mechanism;

said first cam member includes a hole into which a projection at an end of said input member is formed and fitted; and fitting said projection into said hole preventing said first cam member from rotating by said input member.

* * * * *